3,246,067
WET-SPINNING OF AROMATIC POLYESTER FILAMENT OF HIGH OPACITY

Clarence Boyer, Swarthmore, Pa., assignor to E. I. du Pont de Nemours and Company, Wilmington, Del., a corporation of Delaware
No Drawing. Filed May 14, 1962, Ser. No. 194,628
2 Claims. (Cl. 264—203)

This invention relates to a process for the production of novel filamentary materials comprising high molecular weight linear aromatic polyesters. More particularly, this invention relates to a process for the production of novel polyester filaments which are characterized by a lustrous but opaque appearance. Still more particularly, the invention relates to a process for the production of filamentary materials which are characterized by the presence of a multiplicity of voids within the interior of the fiber.

Filaments having voids distributed across the filament cross section have been prepared by a variety of procedures. The most commonly employed technique involves the incorporation in the spinning solution of an additive which is capable of producing a gaseous substance when properly treated. Filaments spun from such a solution thus contain the additive, and treatment of the filament with the proper agent results in the formation of the gas within the filament, creating voids. The most commonly used additive of this type is a carbonate which, upon treatment with an acid, produces carbon dioxide, forming small bubbles within the filament. The use of heat-sensitive substances, of the type which decompose upon thermal treatment to produce a gaseous product, has also been suggested. These techniques produce filamentary products which are characterized by the presence of voids through the entire cross section. Another procedure has been described as being operable for a class of cellulosic compositions, involving the treatment of the as-spun filamentary product with a drying atmosphere such that the exterior portion of the filament is very rapidly dried and solidified but the interior portions retain solvent; treatment of the filament by means of a second, more drastic set of conditions removes the remaining solvent, and produces voids within the interior of the fiber.

It is an object of this invention to provide a process for the production of novel filamentary materials comprising high molecular weight linear aromatic polyesters which are characterized by a lustrous appearance, and by opacity of the fibers.

It is a further object of this invention to provide a process for the production of filaments, each of which contains, within the interior portions of the filament, a multiplicity of opacifying sub-micron size voids.

Still further objects will be apparent from the following specification and claims.

In accordance with these objects, there are provided novel filamentary materials comprising high molecular weight linear wholly aromatic polyesters of a type hereinafter described, which filaments are characterized by the presence of a smooth, dense, lustrous exterior surface and by the presence, within the interior portions of the filament of a multiplicity of opacifying sub-micron size voids. The filamentary materials of this invention are more precisely characterized by exhibiting, in cross section, the appearance of a central void containing portion referred to above, surrounded by a substantially void-free outer area which provides the lustrous surface. The exterior surface extends inward to the extent that it occupies no more than about ⅓ of the cross-sectional area of the filament, and may occupy as little as ⅕ or less of the cross-sectional area. The remainder of the filamentary cross section comprises the interior portion which contains from about 50,000 to about 1,000,000 voids per cubic centimeter, the said voids being of a size within the range of from about .005 micron to about 0.1 micron in diameter. The filaments generally range in denier from about 2 to 15.

The novel process for the preparation of such filamentary materials comprises the extrusion of a solution of the polymer in tetrahydrofuran into a water extraction bath. In the operation of this process, the polymer solution is maintained at a temperature within the range of from about −20° C. to about 40° C., and is extruded through a spinneret having one or more orifices of from about 0.002 to about 0.015 inch diameter into a water-bath maintained at a temperature within the range of from about 0° C. to about 50° C. The filaments which are formed under these conditions are withdrawn from the bath and subjected to drying conditions, followed by drawing and crystallization in accordance with known techniques.

The filament produced by the process of this invention is composed of two sections, a core portion containing multitudinous voids and a shell portion surrounding the core portion and substantially free of voids.

The high molecular weight, i.e., above 10,000, linear aromatic polyesters of utility in the preparation of the filaments according to this invention are, as indicated hereinabove, derived from aromatic dicarboxylic acids or their ester-forming derivatives and bisphenols which may bear additional substituents on the aromatic nuclei. The polyesters contain within the chain repeating units of the formula:

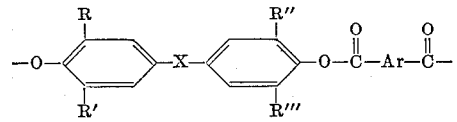

wherein Ar represents a divalent aromatic radical of the class m- or p-phenylene which may additionally bear one or more halogen or lower alkyl groups as substituents; X represents either a carbon-to-carbon bond, or a methylene group which may bear one or two lower alkyl groups; R, R', R", and R'" represent hydrogen, halogen, lower alkyl, or lower alkoxy groups, and may be the same or different groups. The preferred class of polymers is that in which Ar is m-phenylene, X represents an isopropylidene group, and R, R', R", and R'" represent halogen atoms. Among operable polymers for the preparation of the filaments of this invention, the following may be named: poly[4,4'-isopropylidene bis(2,6-dichlorophenyl)isophthalate], derived from 4,4'-isopropylidene bis(2,6-dichlorophenol) and isophthalic acid or a derivative thereof, poly[4,4'-isopropylidene bis(2,6-dichlorophenyl)-5-chloroisophthalate], derived from 4,4 - isopropylidene bis(2,6 - dichlorophenol) and 5-chloroisophthalic acid or a derivative thereof, poly[4,4'-isopropylidene bis(2,6-dichlorophenyl) 5-t-butylisophthalate], derived from 4,4'-isopropylidene bis(2,6-dichlorophenol) and 5-t-butylisophthalic acid or a derivative thereof, poly[4,4'-sec-butylidene bis(2,6-dichlorophenol)terephthalate], derived from 4,4'-sec-butylidene bis(2,6-dichlorophenol) and terephthalic acid or a derivative thereof, the polyester derived from 3,3'5,5'-tetrachloro-4,4'-dihydroxydiphenyl and isophthalic acid or a derivative thereof, the polyester derived from 4,4'-isopropylidene bis(2,6-dibromophenol) and mixtures of isophthalic acid and terephthalic acid or derivatives thereof, the polyester derived from 2,2-bis(4-hydroxyphenyl) propane and 5-chloroisophthalic acid or a derivative thereof, and the like. The singularly preferred polyester is that in which X represents an isopropylidene group, R, R', R", and R'" represent chlorine, and Ar represents m-phenylene, i.e., the preferred polyester is poly[4,4'-isopropylidene bis(2,6-dichlorophenyl) isophthalate].

Among the possible combinations of solvent and bath which might be utilized for the wet-spinning of the polymers of this invention, only the tetrahydrofuran-water system has been found to be operable to provide lustrous, opaque filaments. In tetrahydrofuran, the polymers hereinabove named exhibit a high degree of solubility, and solutions in this solvent remain stable for extended periods of time. Solutions in tetrahydrofuran are not characterized by a tendency for the polymer to become crystalline and precipitate from the solvent medium. In most other solvents, the polymers are characterized by their relatively rapid rate of crystallization and precipitation, following which they may not be utilized for the preparation of shaped articles. The use of water as the extraction bath medium is dictated by the high solubility of tetrahydrofuran in this medium, and by the apparent high rate of diffusion of the organic substance in the aqueous medium.

The process of this invention involves the extrusion of a solution of the polymer in tetrahydrofuran through a spinneret into a water bath. In the preferred embodiment the polymer is dissolved in tetrahydrofuran to form a solution containing between about 15% and about 30% solids. The solution is maintained at a temperature within the range of from about 0° C. to about 15° C. during the spinning operation, and may be stored for several days at a temperature of between about −10° C. and 10° C. without evidence of crystallization and/or precipitation. The polymer solution is forced through the spinneret by a metering pump. Spinnerets of conventional design can be used and may contain one or a plurality of orifices, the diameter of which may range between about 0.003 inch and about 0.006 inch. The polymer solution passes through the spinneret orifices and is contacted by a water bath which may be a mixture of water and tetrahydrofuran, the bath being maintained at a temperature of between about 0° C. and about 25° C. The filaments are withdrawn from the water bath at a rate of between about 25 y.p.m. and about 100 y.p.m. and dried at room temperature or in an air oven maintained at a temperature of about 100° C. Drawing and crystallization operations may be conducted concurrently with the preparation of filaments, or the dried as-spun yarn may be wound up and subjected to drawing and crystallization operations at a subsequent time. The filaments may be drawn while heated by passage over a hot plate maintained at a temperature within the range of from about 225° C. to 250° C. Crystallization may be brought about by passing the filaments over a heated plate maintained at a temperature of about 265° C.

The following examples illustrate the present invention, but are not intended to limit it in any way.

*Example I*

A cold solution consisting of 4.576 grams (0.0125 mole) of 4,4' - isopropylidine bis(2,6 - dichlorophenol), 110 ml. of water, 4.88 ml. of a 5.12 N sodium hydroxide solution, 1.0 gram of tetraethylammonium chloride, and 10 ml. of 10% aqueous "Duponol" ME (the registered trademark for a dry surface active agent comprising technical sodium lauryl sulfate) is placed in a Waring Blendor. While rapidly stirring the solution, a second cold solution comprising 2.538 grams (0.0125 mole) of isophthaloyl chloride in 30 ml. of 1,1,2-trichloroethane is addded, and the two-phase system is rapidly stirred for a period of five minutes. The resulting emulsion is poured into acetone to precipitate the polymeric product, which is separated by filtration. The polymer is washed with water and with a 1/1 alcohol/water mixture, and dried. A polymer similarly prepared but having an inherent viscosity of 1.15, is dissolved in pure, dry tetrahydrofuran, forming a solution containing 17% solids. The solution is prepared by stirring the polymer and solvent while maintaining the temperature of the mixture between about 0° C. and about 5° C. The solution is stored at a temperature of −10° C. until spun, and is metered through a spinneret having 20 holes, each of which has a diameter of three mils. The solution is spun into a water bath maintained at a temperature of 22° C., the bath being 10 feet in length. Yarn is wound up at the rate of 40 y.p.m. Following orientation by drawing the yarn to 3.5 times its original length while it passes over a heated plate maintained at a temperature of 245° C., the fibers exhibit a tenacity/elongation/modulus ratio of 2.4/29/29. A fabric prepared from these filaments exhibits a high degree of opacity and covering power, and a silky appearance.

*Example II*

The polymer utilized in the preceding example, having an inherent viscosity of 1.1, is dissolved in pure, dry tetrahydrofuran to form a solution containing 20% solids. The solution is prepared and maintained under the conditions described in the preceding example, and is spun through a similar spinneret into a water bath in a tank 3 feet long. Rapid formation of a dense exterior surface takes place under these conditions, and the yarn is transferred into a bath containing water and 20% tetrahydrofuran. The latter bath is contained in a tank 10 feet in length. The yarn is wound up at the rate of 25 y.p.m., and can be drawn in the manner previously described. The yarn appears lustrous but opaque and is shown, by photographs of filament cross sections, to contain a multitude of voids within the central portion and a smooth, dense exterior surface.

*Example III*

The polymer utilized in the preceding examples is dissolved in tetrahydrofuran to form a solution containing 23% solids. Polymer having an inherent viscosity of 0.88 is utilized, and preparation, storage, and spinning are as previously noted. Filaments are extruded into an ice water bath, and wound up at the rate of 25 y.p.m. After extraction of the yarn in cold water for 24 hours, it is dried in an air oven maintained at a temperature of 100° C. for a period of 12 hours. The yarn is drawn over a hot plate maintained at a temperature of 225° C. to four times its original length, and exhibits a tenacity/elongation/modulus ratio of 4.0/12/54. A shiny opaque yarn is produced, and photographs of filament cross sections demonstrate the presence of micron-sized voids in the interior of the filaments.

Filaments prepared according to this invention find utility in the preparation of fabrics which are particularly suited to use in apparel and domestic application. The pleasing aesthetics of the fabrics, their high covering power, and lustrous appearance render them highly suitable for uniforms, lingerie, blouses, shirtings, and the like in apparel applications, and the same characteristics suggest utility for curtains, sheeting, and the like in domestic fabrics. Fabrics of a variety of constructions may be advantageously employed for these applications, including taffetas, twills, satins, and novelty weaves. These filaments may also be advantageously blended with cotton and other filamentary materials and employed in fabrics of utility in the same end use applications described above.

What is claimed is:

1. A process for preparing aromatic polyester filaments of high opacity and having a smooth, dense lustrous exterior surface comprising extruding about a 15–30% solution of a polymer having repeating units of the formula

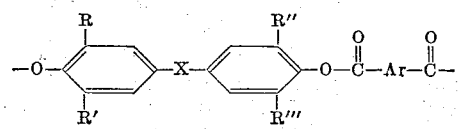

wherein Ar is a divalent radical selected from the group consisting of m-phenylene and p-phenylene and the halo- and lower alkyl-substituted derivatives thereof; X is a member of the group consisting of a carbon-to-carbon bond and

where Z and Z' are selected from the group of hydrogen and lower alkyl; R, R', R'', and R''' are selected from the group consisting of hydrogen, halogen, lower (1–4 C) alkyl and lower alkoxy radicals in tetrahydrofuran through an orifice into a water bath maintained at between about 0° C. and 25° C. whereby voids form in the core portion of the filament and withdrawing the filament from said bath and allowing it to dry.

2. The process of claim 1 wherein the polyester is poly[4,4' - isopropylidene bis(2,6 - dichlorophenyl)isophthalate].

References Cited by the Examiner

UNITED STATES PATENTS

| | | | |
|---|---|---|---|
| 2,677,590 | 5/1954 | Hare et al. | 264—182 |
| 2,677,591 | 5/1954 | Moody | 264—182 |
| 2,780,512 | 2/1957 | Inoshita | 18—54 |
| 2,835,551 | 5/1958 | Kosuge | 18—54 |
| 2,878,201 | 3/1959 | Beindorff et al. | 260—30.4 |
| 2,907,096 | 10/1959 | Halbig | 264—41 |
| 2,948,048 | 8/1960 | Jankens | 28—82 |
| 2,956,974 | 10/1960 | De Witt et al. | 260—30.4 |
| 3,000,849 | 9/1961 | Clachan et al. | 260—30.4 |
| 3,080,210 | 3/1963 | Ucci | 264—203 |
| 3,124,629 | 3/1964 | Knudsen | 264—182 |
| 3,133,898 | 5/1964 | Keck | 260—47 |

FOREIGN PATENTS

| | | |
|---|---|---|
| 877,539 | 9/1961 | Great Britain. |
| 907,647 | 10/1962 | Great Britain. |

OTHER REFERENCES

Statton: "Microvoids in Fibers as Studied by Small-Angle Scattering of X-Rays," 58, Journal of Polymer Science, 205–220 (1962).

ROBERT F. WHITE, *Primary Examiner*.

DONALD W. PARKER, ALEXANDER H. BRODMERKEL, *Examiners*.